US012625803B2

(12) United States Patent
Tamborski et al.

(10) Patent No.: US 12,625,803 B2
(45) Date of Patent: May 12, 2026

(54) IDENTIFYING AND VISUALIZING NAMESPACE RANGE GAPS

(71) Applicant: International Business Machines Corporation, Armonk, NY (US)

(72) Inventors: Patrick Aaron Tamborski, Chicago, IL (US); Shikha Shree, Chicago, IL (US); Asimuddin Kazi, Naperville, IL (US); Stephen Garward, Grayslake, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/938,511

(22) Filed: Nov. 6, 2024

(65) Prior Publication Data

US 2026/0127108 A1 May 7, 2026

(51) Int. Cl.
*G06F 3/06* (2006.01)
*G06F 12/02* (2006.01)
(52) U.S. Cl.
CPC .......... *G06F 12/023* (2013.01); *G06F 3/0604* (2013.01)
(58) Field of Classification Search
None
See application file for complete search history.

(56) References Cited

U.S. PATENT DOCUMENTS

| | | |
|---|---|---|
| 5,761,411 A | 6/1998 | Teague et al. |
| 7,584,219 B2 | 9/2009 | Zybura et al. |

| | | |
|---|---|---|
| 7,987,167 B1 | 7/2011 | Kazar et al. |
| 8,108,483 B2 | 1/2012 | Aust et al. |
| 8,151,352 B1 | 4/2012 | Novitchi |
| 8,447,780 B1 | 5/2013 | Plantenberg et al. |
| 9,142,322 B2 | 9/2015 | Baranwal et al. |
| 9,171,160 B2 | 10/2015 | Vincent et al. |
| 9,535,774 B2 | 1/2017 | Cher et al. |
| 9,686,293 B2 | 6/2017 | Golshan et al. |
| 10,275,361 B2 | 4/2019 | Ish et al. |

(Continued)

OTHER PUBLICATIONS

Authors et. al.: Disclosed Without Attribution, IP.com No. IPCOM000252417D, "Method and System for Classifying Memory Devices and Slices to Create Optimal Storage Decisions in Distributed Storage Network (DSN)", Jan. 9, 2018, 3 pages.

(Continued)

*Primary Examiner* — Brian R Peugh
(74) *Attorney, Agent, or Firm* — CANTOR COLBURN LLP; Stephen Yoder

(57) ABSTRACT

Examples described herein provide a computer-implemented method that includes receiving, at a management device from a plurality of storage devices, namespace information for each of the plurality of storage devices, the namespace information being shared among the plurality of storage devices. The method further includes determining, by the management device, whether a namespace gap exists based at least in part on the namespace information for each of the plurality of storage devices. The method further includes, responsive to determining that the namespace gap exists, generating a graphical representation of the namespace gap. The method further includes, responsive to determining that the namespace gap exists, implementing a corrective action to remediate the namespace gap.

17 Claims, 17 Drawing Sheets

400

402 Receive, At A Management Device From A Plurality Of Storage Devices, Namespace Information For Each Of The Plurality Of Storage Devices, The Namespace Information Being Shared Among The Plurality Of Storage Devices 404 Determine, By The Management Device, Whether A Namespace Gap Exists Based At Least In Part On The Namespace Information For Each Of The Plurality Of Storage Devices 406 Responsive To Determining That The Namespace Gap Exists, Generate A Graphical Representation Of The Namespace Gap 408 Responsive To Determining That The Namespace Gap Exists, Implement A Corrective Action To Remediate The Namespace Gap

(56) References Cited

U.S. PATENT DOCUMENTS

| | | | |
|---|---|---|---|
| 10,884,648 | B2 | 1/2021 | Guo et al. |
| 10,891,068 | B2 | 1/2021 | Guo et al. |
| 11,226,860 | B1 | 1/2022 | Baptist et al. |
| 11,314,442 | B2 | 4/2022 | Kazi et al. |
| 11,412,041 | B2 | 8/2022 | Tamborski et al. |
| 11,588,892 | B1 | 2/2023 | Khadiwala et al. |
| 11,973,823 | B1 | 4/2024 | Ghorpade et al. |
| 2007/0006048 | A1 | 1/2007 | Zimmer et al. |
| 2011/0145838 | A1 | 6/2011 | De et al. |
| 2013/0326284 | A1 | 12/2013 | Losh et al. |
| 2014/0032962 | A1 | 1/2014 | Deshpande |
| 2015/0074469 | A1 | 3/2015 | Cher et al. |
| 2015/0127919 | A1 | 5/2015 | Baldwin et al. |
| 2015/0243373 | A1 | 8/2015 | Chun et al. |
| 2016/0019983 | A1 | 1/2016 | Chung |
| 2016/0072889 | A1 | 3/2016 | Jung et al. |
| 2017/0004309 | A1 | 1/2017 | Pavlyushchik et al. |
| 2017/0090824 | A1 | 3/2017 | Tamborski |
| 2017/0093978 | A1 | 3/2017 | Cilfone et al. |
| 2018/0025025 | A1 | 1/2018 | Davis et al. |
| 2018/0239697 | A1* | 8/2018 | Huang ............... G06F 12/0246 |
| 2018/0314441 | A1 | 11/2018 | Suryanarayana et al. |
| 2019/0065524 | A1 | 2/2019 | Johnson et al. |
| 2019/0146675 | A1 | 5/2019 | Subramanian et al. |
| 2019/0146907 | A1* | 5/2019 | Frolikov ............ G06F 12/0246 711/103 |
| 2019/0188589 | A1 | 6/2019 | Ponnuru et al. |
| 2019/0278498 | A1 | 9/2019 | Dedrick |
| 2019/0281114 | A1 | 9/2019 | Cocagne |
| 2019/0394272 | A1 | 12/2019 | Tamborski et al. |
| 2020/0019447 | A1 | 1/2020 | Tamborski et al. |
| 2020/0050365 | A1 | 2/2020 | Tamborski et al. |
| 2020/0104056 | A1 | 4/2020 | Benisty et al. |
| 2020/0183840 | A1 | 6/2020 | Johns et al. |
| 2020/0192799 | A1 | 6/2020 | Johns et al. |
| 2020/0278896 | A1 | 9/2020 | Kumari et al. |
| 2020/0409559 | A1 | 12/2020 | Sharon et al. |
| 2021/0173582 | A1 | 6/2021 | Kazi et al. |
| 2021/0216227 | A1 | 7/2021 | Kazi et al. |
| 2021/0349782 | A1 | 11/2021 | Ki et al. |
| 2021/0367834 | A1 | 11/2021 | Palavalli et al. |
| 2022/0236916 | A1 | 7/2022 | Esaka et al. |
| 2023/0195577 | A1 | 6/2023 | Darnell et al. |
| 2023/0401120 | A1 | 12/2023 | Gim et al. |
| 2024/0220227 | A1 | 7/2024 | Kerr et al. |
| 2024/0361939 | A1* | 10/2024 | Brown, Jr. .............. G06F 3/061 |

OTHER PUBLICATIONS

Authors et. al.: Disclosed Without Attribution, IP.com No. IPCOM000263306D, "Dispersed Storage Namespace Health Based Device Prioritization and Recovery Algorithm", Aug. 17, 2020, 7 pages.

Authors et. al.: Disclosed Without Attribution, IP.com No. IPCOM000263385D, "Methodology of Hinting the NVME Host about the NVME Queues Optimized for NVME Namespace Operation", Aug. 26, 2020, 7 pages.

Authors et. al.: Seagate Technology, LLC, IP.com No. IPCOM000268073D, "Staged NVMe in a Primary/Secondary Relationship", Dec. 21, 2021, 4 pages.

Han et al. "ZNS+: Advanced Zoned Namespace Interface for Supporting In-Storage Zone Compaction", Proceedings of the 15th USENIX Symposium on Operating Systems Design and Implementation, Jul. 14-16, 2021, 17 pages.

Kazi, et al. "Namespace Range-Based Memory Device Compaction," U.S. Appl. No. 19/078,385, filed Mar. 13, 2025, 29 pages.

Kazi, et al. "Proactive Operating System Memory Unit Replacement Based on Namespace Health," U.S. Appl. No. 18/938,516, filed Nov. 6, 2024, 24 pages.

Kazi, et al. "Upgrade Orchestration of a Storage System Based on Namespace Range Gaps," U.S. Appl. No. 18/938,502, filed Nov. 6, 2024, 40 pages.

Min et al. "eZNS: Elastic Zoned Namespace for Enhanced Performance Isolation and Device Utilization", ACM Transactions on Storage, Jun. 6, 2024, pp. 1-41, vol. 20, Issue 3.

Tamborski, et al. "Processing Namespace Range Information by a Global Coordinator," U.S. Appl. No. 18/938,523, filed Nov. 6, 2024, 27 pages.

Wang David. "Application Optimization with Flexible Zone Namespace Configurations in QLC-Based SSDs", Silicon Motion, 2023, 16 pages.

Rahi Rohit, "Object Storage", Oct. 2019, 18 pages, https://www.oracle.com/a/ocom/docs/cloud/object-storage-100.pdf.

SNIA, "The SNIA Dictionary", Mar. 2022, 02 pages, https://www.snia.org/sites/default/files/dictionary/SNIADictionary.pdf.

United States Non-Final Rejection dated Oct. 27, 2025, 15 pages, in U.S. Appl. No. 18/938,523.

United States Non-Final Rejection dated Oct. 2, 2025, 38 pages, in U.S. Appl. No. 18/938,516.

"Intel® Optane™ DC SSD Series", Intel, Feb. 2012, 5 pages, https://ark.intel.com/content/www/us/en/ark/products/series/213706/intel-optane-dc-ssd-series.html.

"Intel® Solid-State Drive 520 Series", Intel, Sep. 9, 2024, 27 pages, https://www.intel.com/content/dam/www/public/us/en/documents/product-specifications/ssd-520-specification.pdf.

"SMART Attribute Details", Kingston, 2015, 9 pages, https://media.kingston.com/support/downloads/MKP_306_SMART_attribute.pdf.

"SSD Failures: Common Causes and Main Bad Symptoms", Multi-cloud backup Solutions, Oct. 27, 2020, 9 pages, https://www.salvagedata.com/ssd-failures-common-causes-and-main-symptom/.

"Tabular Classification", Hugging Face, retrieved from web dated Dec. 20, 2024, 4 pages.

"What is supervised learning?", IBM, retrieved from web dated Dec. 20, 2024, 9 pages.

Diamantopoulos et al. "WannaLaugh: A Configurable Ransomware Emulator—Learning to Mimic Malicious Storage Traces", arXiv:2403.07540v2 [cs. CR], Jun. 12, 2024, 22 pages, https://arxiv.org/abs/2403.07540v1#.

Gagulic et al. "Ransomware Detection with Machine Learning in Storage Systems", University of Zurich Department of Informatics (IFI) Binzmühlestrasse 14, CH-8050 Zurich, Switzerland, Feb. 13, 2023, 114 pages, https://files.ifi.uzh.ch/CSG/staff/vonderassen/extern/theses/map-gagulic-zumtaugwald-sahu.pdf.

Kruegel Christopher. "Full System Emulation: Achieving Successful Automated Dynamic Analysis of Evasive Malware", Lastline, 2014, 7 pages.

Rout Sidhartha Sankar. "Reliability Aware Intelligent Memory Management (RAIMM)", Indraprastha Institute of Information Technology Delhi, New Delhi, 2014, 54 pages, https://repository.iiitd.edu.in/jspui/handle/123456789/146.

Sharma Natasha. "K-Means Clustering Explained", Neptune Blog, Apr. 15, 2024, 25 pages.

Sharma Pulkit. "An Introduction to K-Means Clustering", Machine Learning, Dec. 18, 2024, 43 pages.

Taylor et al. "Sensor-based Ransomware Detection", Future Technologies Conference (FTC), Nov. 29-30, 2017, 8 pages, https://s2.smu.edu/~mitch/ftp_dir/pubs/ftc17.pdf.

Wijaya Cornellius Yudha. "LLMs Implementation for Tabular Classifications", Trying out ML Tabular Classification Task with LLM, Nov. 16, 2023, 9 pages.

Zhang et al. "Towards Foundation Models for Learning on Tabular Data", arXiv:2310.07338 [cs.LG], Oct. 11, 2023, 22 pages.

United States Non-Final Rejection dated Feb. 9, 2026, 45 pages, in U.S. Appl. No. 18/938,502.

Lucia Theo. "An Ultimate Guide to Hard Drive Problems, Solutions and Tips", The Wayback Machine, Jan. 13, 2021, 25 pages, retrieved from https://web.archive.org/web/20210120063626/https://recoverit.wondershare.com/computer-problem/common-hard-drive-problems-and-solution.html.

* cited by examiner

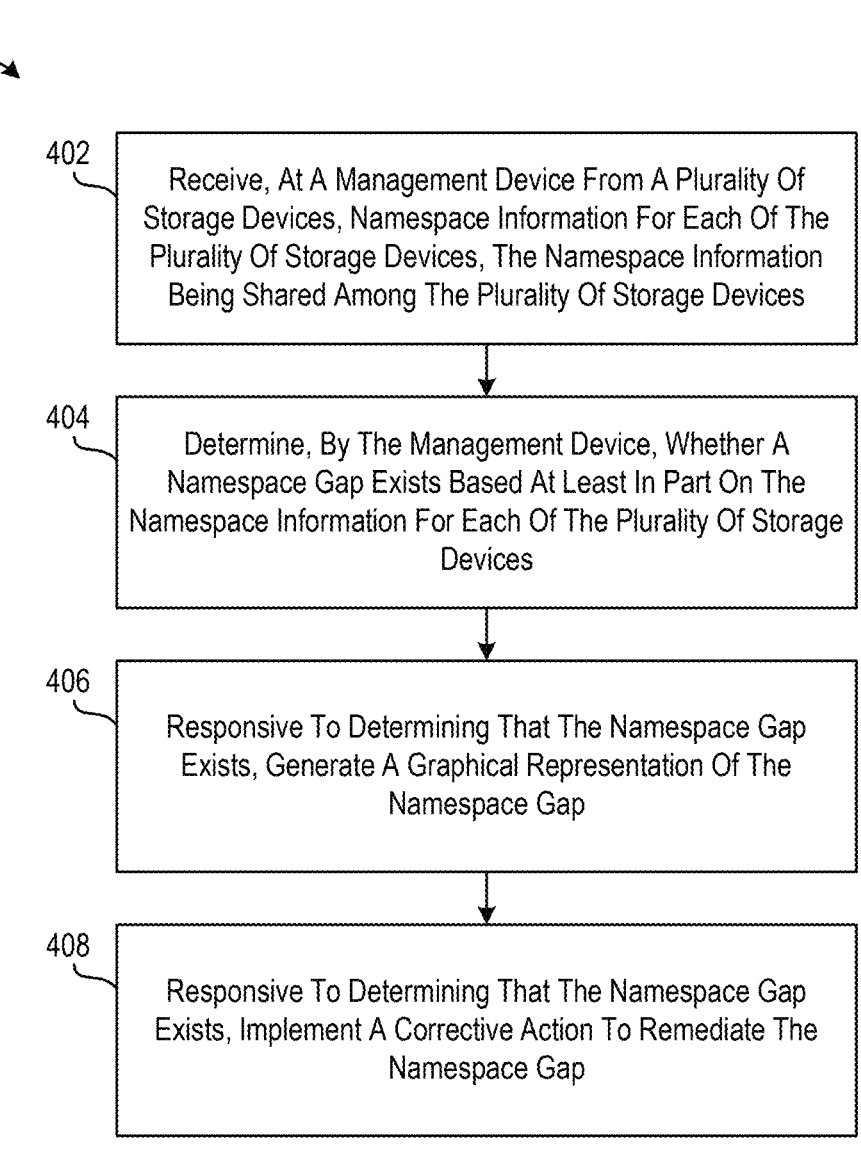

400

402

Receive, At A Management Device From A Plurality Of Storage Devices, Namespace Information For Each Of The Plurality Of Storage Devices, The Namespace Information Being Shared Among The Plurality Of Storage Devices

404

Determine, By The Management Device, Whether A Namespace Gap Exists Based At Least In Part On The Namespace Information For Each Of The Plurality Of Storage Devices

406

Responsive To Determining That The Namespace Gap Exists, Generate A Graphical Representation Of The Namespace Gap

408

Responsive To Determining That The Namespace Gap Exists, Implement A Corrective Action To Remediate The Namespace Gap

0000....
FFFF....

Pillar 0
Pillar 1
Pillar 2
Pillar 3
Pillar 4
Pillar 5
Pillar 6
Pillar 7

*FIG. 6B*

0000...
FFFF...

Pillar 0
Pillar 1
Pillar 2
Pillar 3
Pillar 4
Pillar 5
Pillar 6
Pillar 7

IDENTIFYING AND VISUALIZING NAMESPACE RANGE GAPS

BACKGROUND

The present disclosure relates to computing environments, and more specifically, to identifying and visualizing namespace range gaps.

Computing devices communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

A computing device may effectively extend its CPU by using "cloud computing" to perform one or more computing functions (e.g., a service, an application, an algorithm, an arithmetic logic function, etc.) on behalf of the computing device. Further, for large services, applications, and/or functions, cloud computing may be performed by multiple cloud computing resources in a distributed manner to improve the response time for completion of the service, application, and/or function. For example, Hadoop is an open-source software framework that supports distributed applications, enabling application execution by hundreds or thousands of computers.

In addition to cloud computing, a computing device may use "cloud storage" as part of its memory system. Cloud storage enables a user, via its computing device, to store files, applications, etc., on an Internet-based storage system. The Internet-based storage system may include a RAID (redundant array of independent disks) system and/or a dispersed storage system that uses an error correction scheme to encode data for storage.

SUMMARY

According to an embodiment, a computer-implemented method for identifying and visualizing namespace range gaps is provided. The method includes receiving, at a management device from a plurality of storage devices, namespace information for each of the plurality of storage devices, the namespace information being shared among the plurality of storage devices. The method further includes determining, by the management device, whether a namespace gap exists based at least in part on the namespace information for each of the plurality of storage devices. The method further includes, responsive to determining that the namespace gap exists, generating a graphical representation of the namespace gap. The method further includes, responsive to determining that the namespace gap exists, implementing a corrective action to remediate the namespace gap.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

FIG. 4 illustrates a flow diagram of a method for identifying and visualizing namespace range gaps, according to an embodiment;

FIGS. 5A-5C schematically illustrate an example of identifying and visualizing namespace range gaps, according to an embodiment;

FIGS. 6A and 6B schematically illustrate an example of identifying and visualizing namespace range gaps, according to an embodiment;

DETAILED DESCRIPTION

Figure 1:
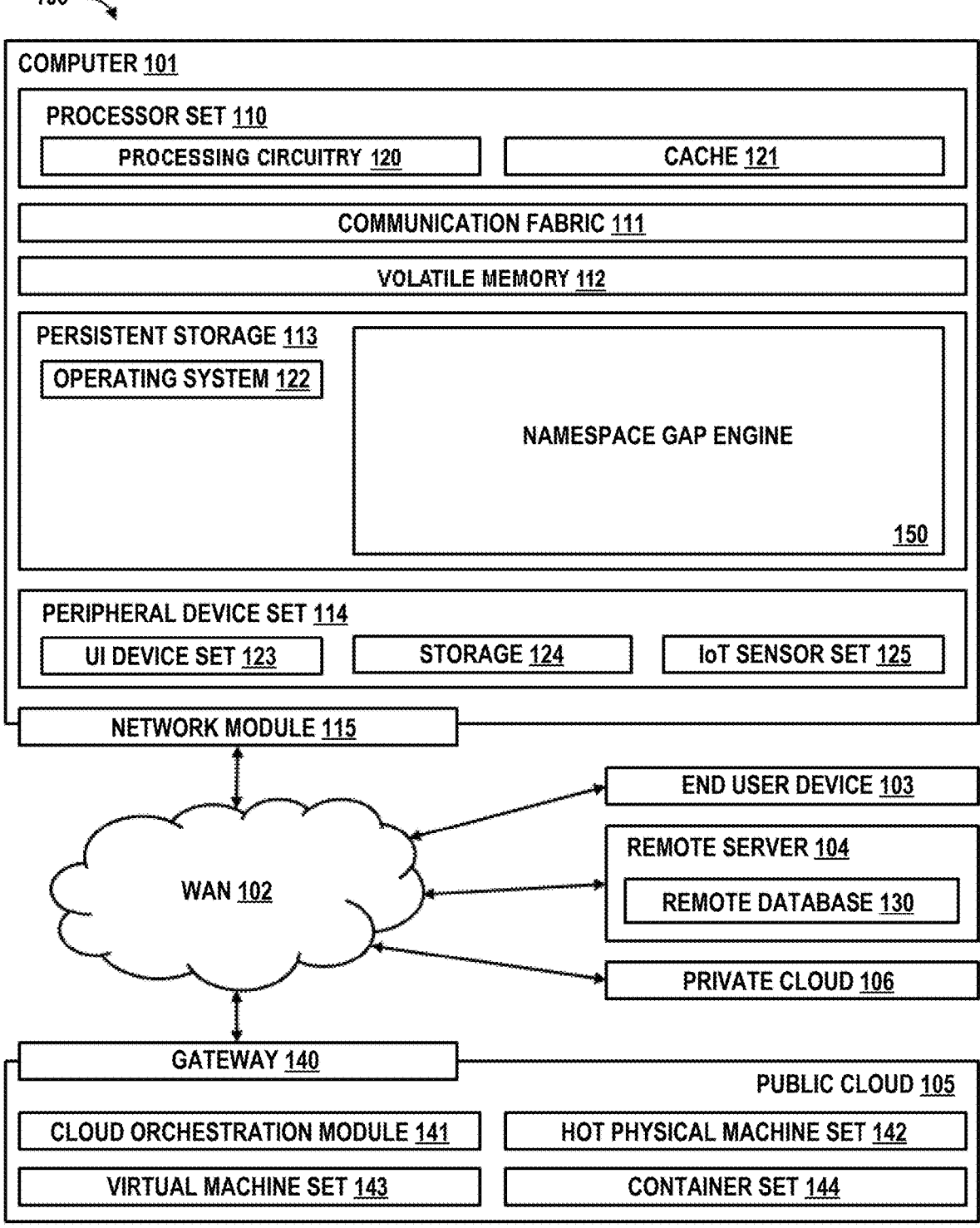
FIG. 1 illustrates a block diagram of a computing environment, according to an embodiment.

One or more embodiments described herein provide for identifying and visualizing namespace range gaps.

Storage systems refer to the various methods and technologies used to save, manage, and retrieve data. They encompass a range of solutions, from traditional hard disk drives (HDDs) and solid-state drives (SSDs) to advanced cloud-based and network-attached storage (NAS) systems. These systems are useful for both individuals and organizations to securely store and access data efficiently. Storage systems can be classified into primary storage, which includes high-speed devices for quick access, and secondary storage, which provides larger capacity and longer-term data retention. Advanced storage solutions also utilize technologies like RAID configurations, distributed storage, and object storage, which enhance data redundancy, reliability, and scalability. Modern systems often integrate with cloud infrastructure, providing versatile options for backup, disaster recovery, and data synchronization across multiple locations.

In a storage system, a namespace provides a structured way to organize and manage data by assigning a unique identifier to each data element or object. This allows for easy retrieval and categorization, similar to how file paths work in a filesystem. A namespace ensures that data within the system can be accessed without ambiguity, as each item has a distinct identifier. In distributed and cloud storage systems, namespaces are useful for managing data across multiple storage nodes and locations, enabling seamless scaling and access control. By abstracting data storage from physical devices, namespaces also facilitate features, such as data deduplication, versioning, and metadata management, making it easier to implement policies for data lifecycle, security, and compliance.

Gaps in namespaces can occur when data is assigned a name and the underlying storage mechanism responsible for the name is unreadable or unavailable.

One attempt to address gaps in namespaces is to use coarse-grained monitoring and management. However, this approach focuses more on device and drive health but does not reflect the impact on the overall namespace. In some cases, unreliable systems with poor information dispersal algorithms (IAD) require frequent support for namespace health. Customers (e.g., users) often lack knowledge about safe maintenance periods for data storage units, risking data loss due to inappropriate handling. Identifying gaps in a namespace is labor-intensive and inefficient. Significant gaps can threaten storage system availability and current approaches to identifying gaps in namespaces lack prompt and sufficient notifications for proactive risk mitigation.

Descriptions of various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to an embodiment. Computing environment 100 contains an example of an environment for the execution of at least some of the computer code involved in performing the inventive methods, such as a namespace gap engine 150 for generating parameters for statistical timing analysis of a circuit. In addition to the namespace gap engine 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the namespace gap engine 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the namespace gap engine 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in the namespace gap engine 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
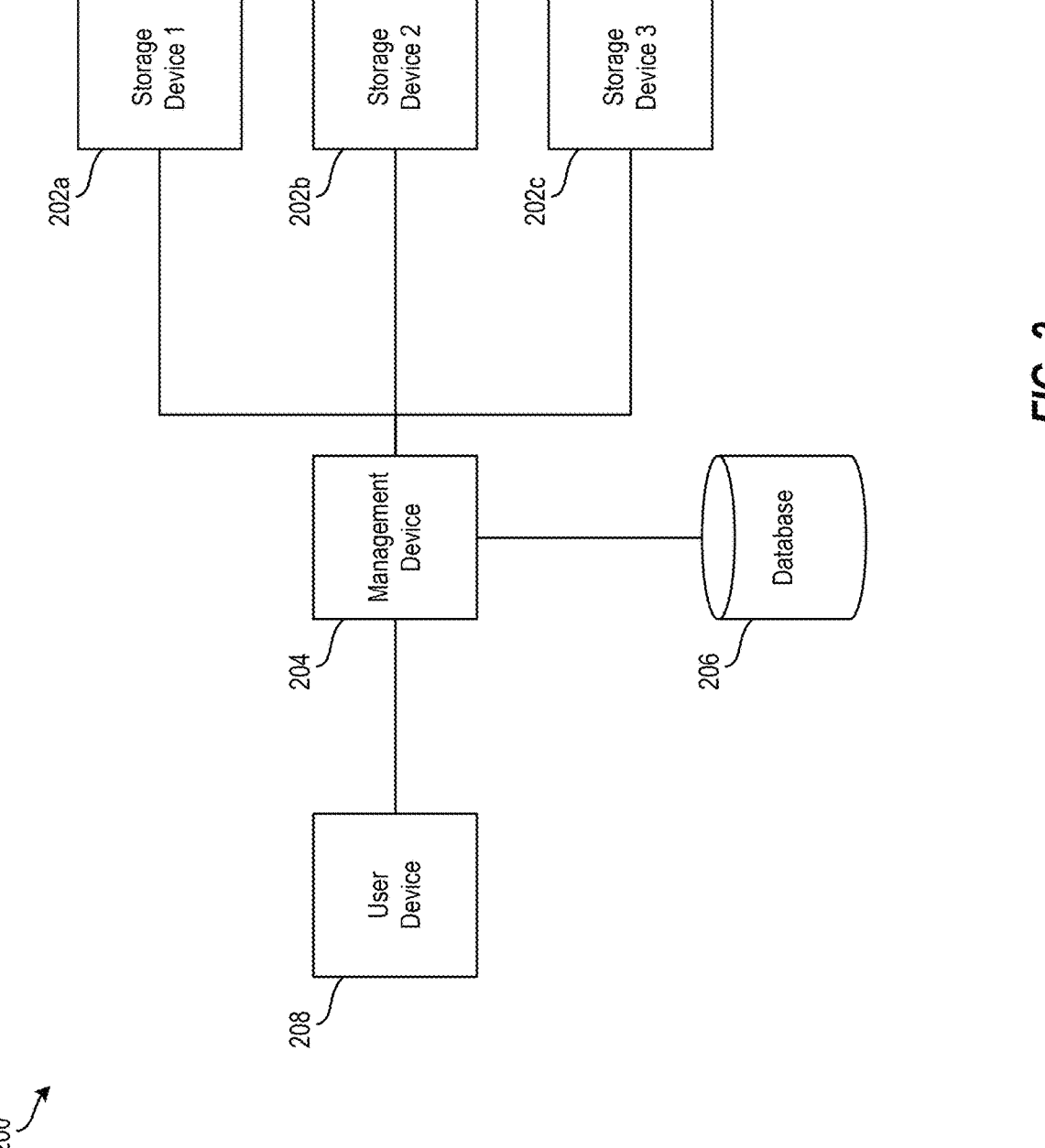
FIG. 2 schematically illustrates a block diagram of a storage system for identifying and visualizing namespace range gaps, according to an embodiment.

FIG. 2 illustrates a block diagram of a storage system 200 for identifying and visualizing namespace range gaps, according to an embodiment. The storage system 200 is an example of a data storage network (DSN). The storage system 200 can be implemented by any suitable computing system, device, or environment, such as those described herein. The storage system 200 includes multiple storage devices, including storage device 1 202a, storage device 2 202b, and storage device 3 202c (collectively referred to as "storage devices 202" and also referred to as "storage units"). Although three storage devices are shown, other numbers (e.g., fewer or greater) of storage devices can be implemented in other embodiments. The storage devices 202 are communicatively connected to a management device 204 for managing aspects of the storage devices 202. The management device 204 is also communicatively connected to a database 206, which stores information about the storage devices 202, such as information about namespace range gaps, as well as other suitable information. The management device 204 can notify a user via user device 208 of any namespace range gaps and/or other suitable information. The user device 208 can be any suitable system or device, such as a laptop computer, desktop computer, virtual computer environment, smartphone, tablet computer, wearable computing device, and/or the like, including combinations and/or multiples thereof.

With continued reference to FIG. 2, the management device 204 oversees distributed data storage by setting parameters for the storage devices 202. Such parameters can be used for vault creation, storage, security, etc. The management device 204 coordinates the creation of a vault (e.g., a virtual memory block associated with a portion of an overall namespace of the storage devices 202) within the memory of the storage devices 202. The management device 204 generates a slice name (SN) for each of the encoded data slices of the storage devices 202. The slice name includes pillar number of the encoded data slice, a data segment number, a vault identifier, which serves as a DSN address for storage and retrieval, and/or the like, including combinations and/or multiples thereof.

Data storage units (e.g., the storage devices 202) are assigned memory devices to store and retrieve slices, aiming to balance storage availability. The management device 204 assigns DSN address ranges to storage units (e.g., the storage devices 202) and generates resource assignment information, including dispersal parameters, storage unit identifiers, addressing details, and/or the like, including combinations and/or multiples thereof. This information is distributed to the storage devices 202 to initialize their use for storing encoded data slices. To recover data segments, a decode threshold number of encoded data slices is required to recover the data segment, and a write threshold number of encoded data slices is needed for a successful write operation recovery. Each of the storage devices 202, with its processor and memory, provides resource availability information to the management device 204, receives resource assignment information, and selects memory devices for the new DSN memory based on this information.

One or more embodiments described herein provide for detecting and alert users about holes or gaps within a namespace range that may not be apparent through existing management applications. One or more embodiments provide timely notifications and actionable insights to proactively address issues, leading to healthier and more robust data storage units (e.g., storage devices 202). One or more embodiments aims to simplify and enhance namespace health support, making it more scalable, efficient, and user-friendly.

In particularly, one or more embodiments described herein provide for identifying and visualizing namespace range gaps. According to one or more embodiments, this is achieved through generating alerts for each stripe where a gap is identified and by highlight worst gaps in that stripe. According to one or more embodiments, alerts can be generated based on different criteria, such as storage type or fault level. Alerts can be broken down into various levers, such as per set, per vault, and/or the like, including combinations and/or multiples thereof, and can be adjusted based on logical units. This information can also aid tracking the age of gaps in storage devices.

A namespace range can include exemplars to identify requests, such as defining metric exemplars for traces. A namespace range gap affects the health of storage units, and a shrinking gap metric can be linked to rebuilder. One or more embodiments described herein not only helps identify namespace gaps but also provides a clearer understanding of how specific namespaces are affected by bad drives. The management device 204 can take actions, such as informing operators, creating alerts about speed, order, remediation, action plans, and execution plans based on namespace information.

Aggregating gaps in memory for reporting significantly reduces the time required for manually managing the namespace, increase the efficiency of identifying namespace range gaps, and ensures timely, proactive measures to maintain the stability and reliability of the storage system.

With continued reference to FIG. 2, the management device 204 exposes a new metric that publishes the actual NSR gaps identified across disks on one or more of the storage devices 202. According to one or more embodiments, one or more of the storage devices 202 can publish the active namespace ranges, which allows another of the storage devices 202 derive the inverse and calculate the NSR gaps. The management device 204 organizes the NSR gap information from each of the storage devices 202 and persists this information in a file (e.g., in the database 206), with fields, such as drive identifier, vault identifier, pillar index, storage type, minimum range, maximum range, and/ or the like, including combinations and/or multiples thereof.

The information stored in the database 206 can be aggregated in memory to generate alerts or incidents for the user associated with the user device 208. According to one or more embodiments, incidents are generated on a per-stripe basis whenever a NSR gap is identified in a portion of the namespace, with each incident indicating the worst hole in a stripe across all storage types. Alerts can be decomposed into multiple levels, such as per vault, per storage type, and per stripe, from highest to lowest level. Alerting can also be customized based on logical units, and an advanced configuration mechanism will allow alerts to be turned off if necessary.

Additionally, the information stored in the database 206 can impact the health of one or more of the storage devices 202. The shrinking gaps can be associated with rebuilder agents, functions, etc. The information stored in the database 206 can also be used such that the system can also track the age of a hole in a storage unit. Different managing units can act by informing users through alerts, which include details about speed, order, corrective actions, execution plans, and/ or the like, including combinations and/or multiples thereof. This comprehensive approach ensures that namespace gap data is effectively utilized to derive actionable results, generate alerts, and manage the health and performance of storage units.

Figure 3:
FIG. 3 illustrates a sequence diagram for identifying and visualizing namespace range gaps, according to an embodiment.

FIG. 3 illustrates a sequence diagram 300 for identifying and visualizing namespace range gaps, according to an embodiment. In this example, the sequence diagram 300 illustrates how namespace gaps are identified in one or more of the storage devices 202, namely the storage device 1 202a and the storage device 2 202b, using the management device 204.

At action 302, the storage device 2 202b notifies the storage device 1 202a to read NSR gap metrics. Once notified, the storage device 1 202a exposes its NSR gap metrics (also referred to as "namespace information" and, at action 304, the storage device 2 202b reads the new NSR gap metrics from the storage device 1 202a. This exchange ensures that both storage devices 202a, 202b have synchronized data regarding the namespace gaps. At action 306, the namespace information is sent to the management device 204, which persists the namespace information in the database 206 at action 308. The management device 204 can use the namespace information to determine whether a namespace range gap exists. This can be done by looping over each stripe to identify a gap that results in a fault operating in a read only/alert/write only mode and generating an alert or graphical representation to notify the user via the user device 208, at action 310. This communication provides the user with insights into the namespace gaps, enabling informed decision-making and potential corrective actions.

Turning now to FIG. 4, a flow diagram of a method 400 for identifying and visualizing namespace range gaps is provided, according to an embodiment. The method 400 can be performed by any suitable computing system, device, or environment, such as those described herein. The method 400 is now described with reference to the computing environment 100, and particularly the namespace gap engine 150, but is not so limited.

The method 400 begins at block 402, where the management device 204 (e.g., the namespace gap engine 150) receives, from a plurality of storage devices (e.g., the storage devices 202). The namespace information is shared among the plurality of storage devices. For example, the storage device 202a shares its namespace information with the storage devices 202b and 202c. The management device 204, which may include the namespace gap engine 150, plays a role in gathering and processing this information. The management device 204 ensures that the namespace information is accurately collected and distributed among the storage devices, facilitating the identification of namespace gaps.

At block 404, the management device 204 (e.g., the namespace gap engine 150) determines whether a namespace gap exists based at least in part on the namespace information for each of the plurality of storage devices. This determination involves analyzing the namespace data to identify any discontinuities or gaps that may affect the performance of the storage system 200. The management device 204 utilizes algorithms and processing capabilities to assess the namespace information, ensuring that any potential gaps are detected promptly. According to one or more embodiments, determining whether the namespace gap exists includes looping over each stripe of the plurality of storage devices to identify a gap that results in a vault operating in one of read only, alert, or write only mode.

At block 406, responsive to determining that the namespace gap exists management device 204 (e.g., the namespace gap engine 150) generates a graphical represen-
tation of the namespace gap. This graphical representation
provides a visual depiction of the identified gaps, allowing
users to understand the extent and location of the gaps within
the namespace. The management device 204 employs visu-
alization techniques to create clear and informative graphics
that highlight the namespace gaps, aiding in the decision-
making process for remediation. Examples of such graphical
representations of the namespace gap are described in fur-
ther detail herein with reference to FIGS. 5-10B.

At block 408, responsive to determining that the
namespace gap exists, management device 204 (e.g., the
namespace gap engine 150) implements a corrective action
to remediate the namespace gap. The corrective action may
involve adjusting storage parameters, reallocating resources,
or other suitable measures to address the identified gaps.

Examples of corrective actions are as follows, but are not
so limited:

Adjusting Storage Parameters: Modify the configuration
of storage devices to optimize data distribution and mini-
mize gaps. This may involve changing allocation strategies
or adjusting redundancy settings.

Reallocating Resources: Redistribute data across avail-
able storage units to fill gaps and ensure balanced usage.
This can help improve access times and overall storage
system efficiency.

Implementing Data Rebuilding: Use rebuilder agents to
reconstruct missing or corrupted data segments, ensuring
data integrity and availability.

Enhancing Monitoring and Alerts: Set up advanced moni-
toring systems to detect gaps early and alert operators for
timely intervention. This includes customizing alert levels
based on logical units or storage types.

Conducting Regular Maintenance: Schedule regular
checks and maintenance to prevent gaps from occurring due
to hardware failures or outdated configurations.

Utilizing Data Deduplication: Implement deduplication
techniques to reduce redundant data, freeing up space and
potentially closing gaps.

Optimizing Data Placement: Use algorithms to determine
the most efficient placement of data within the storage
system, minimizing gaps and improving performance.

The management device 204 coordinates these actions,
ensuring that the namespace gaps are effectively mitigated to
maintain the stability and reliability of the storage system.
These actions aim to maintain the stability and reliability of
the storage system by effectively managing namespace gaps.
Corrective actions in the storage system 200 significantly
improve performance and functionality of the storage sys-
tem 200 by addressing namespace range gaps, which can
otherwise lead to inefficiencies and data access issues. By
adjusting storage parameters and reallocating resources, the
storage system 200 ensures optimal data distribution, reduc-
ing latency and improving access times. Implementing data
rebuilding and deduplication techniques enhances data
integrity and frees up storage space, respectively, leading to
more efficient use of resources. Enhanced monitoring and
alert systems allow for early detection of potential issues,
enabling timely interventions that prevent disruptions.
Regular maintenance and optimized data placement further
ensure that the storage system operates smoothly, maintain-
ing high availability and reliability. These actions collec-
tively contribute to a robust and efficient storage environ-
ment, capable of handling large volumes of data with
minimal downtime.

Additional processes also may be included, and it should
be understood that the processes depicted in FIG. 4 represent illustrations, and that other processes may be added or
existing processes may be removed, modified, or rearranged
without departing from the scope of the present disclosure.
It should also be understood that the processes depicted in
FIG. 4 may be implemented as programmatic instructions
stored on a non-transitory computer-readable storage
medium that, when executed by a processor (e.g., the
processor set 110, the processing circuitry 120) of a com-
puting system (e.g., the computer 101), cause the processor
to perform the processes described herein.

One or more embodiments provides for warning a user
associated with the user device 208 by providing a graphical
representation, such as a report, incident, visual representa-
tion, etc., to identify a gap in a portion of the namespace
range. This can be done on a per stripe, set, storage pool, or
vault basis, for example. In distributed storage systems, if
health of the system is calculated by the overall health of a
node (e.g., one of the storage devices 202), then this may
result in reporting false positive or negative system's health.
By identifying the gap in the namespace range and visually
representing that namespace range gap, a user can be
informed about the gap(s) the namespace range and the
gap(s) can be corrected to improve performance of the data
storage system.

Examples of visual representations for depicting
namespace range gaps are now described with reference to
FIGS. 5A-10B. In these examples, the following assump-
tions may be made, but merely to illustrate features of the
embodiments described herein; such assumptions should not
be considered limiting. If five or more drives are not
available on a memory device, then the memory device is
considered in error state. Each of the memory devices have
48 drives (although other numbers of drives may be used in
other embodiments). Each of the drives have substantially
the same capacity. The namespace range is substantially
uniformly distributed on each drive.

If 8-wide information dispersal algorithm (IDA) across 8
memory devices (Single Stripe System) is used, where the
number of memory devices is equal to IDA width, each
memory device is responsible for exactly one pillar of slices,
and the set contains exactly one stripe. This configuration is
shown in FIG. 5A.

Examples of the graphical representations are now
described in more detail.

Figure 5A:
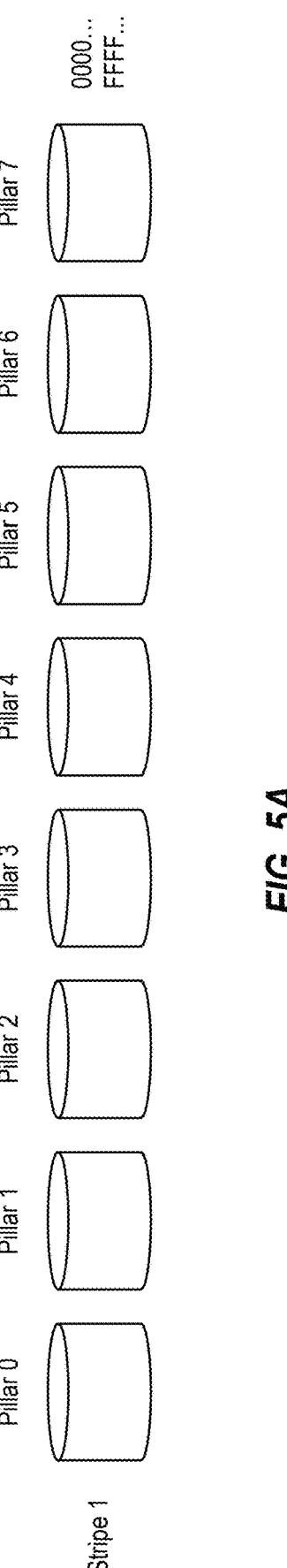
Figure 5B:
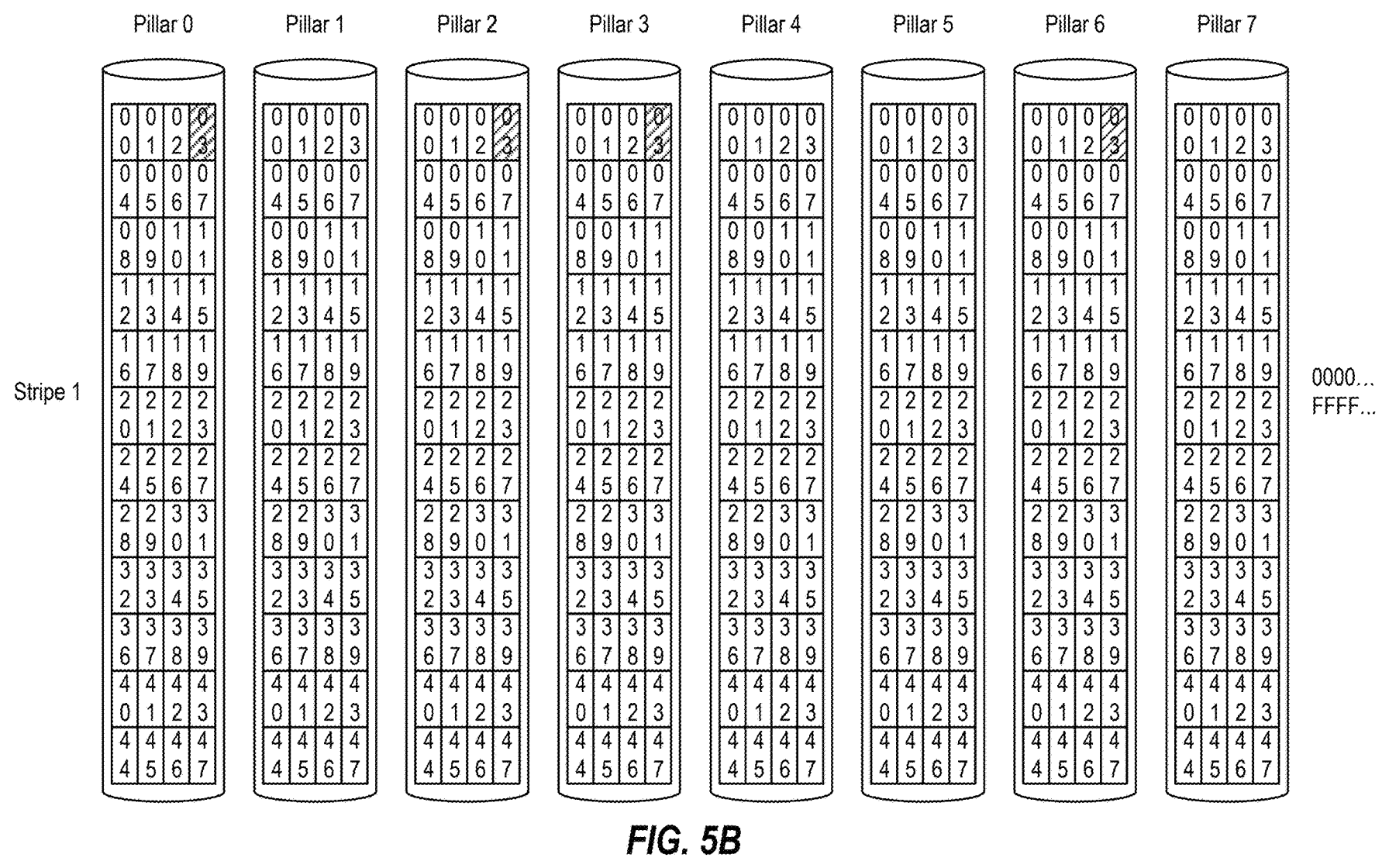
Figure 5C:
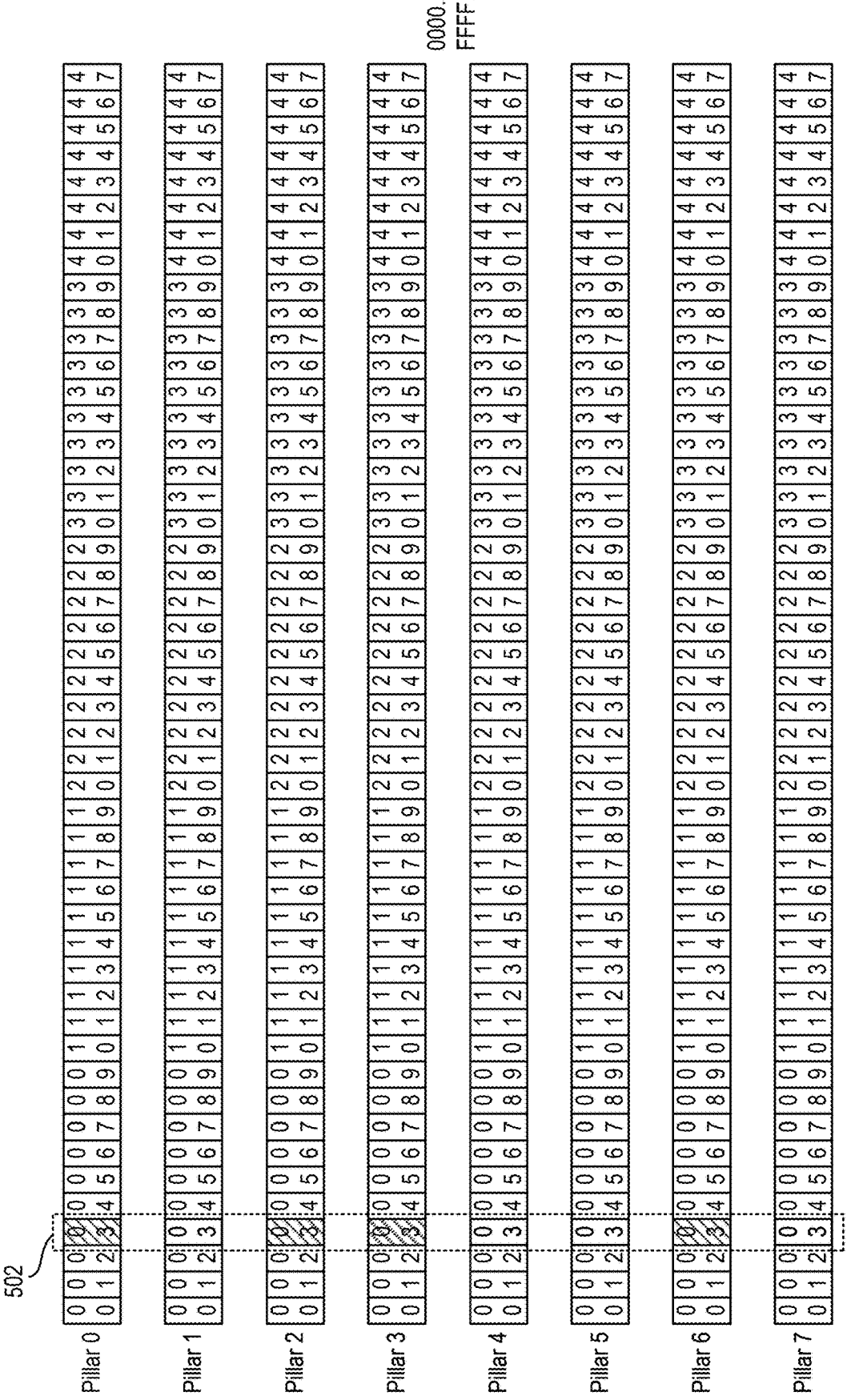

FIGS. 5A-5C schematically illustrate an example of iden-
tifying and visualizing namespace range gaps, according to
an embodiment.

FIG. 5A shows a representation of Stripe 1, which
includes multiple components referred to as Pillars, namely
Pillar 0, Pillar 1, Pillar 2, Pillar 3, Pillar 4, Pillar 5, Pillar 6,
and Pillar 7. These components collectively form a part of
the namespace structure within a storage system 200. Stripe
1 serves as a logical grouping of data segments distributed
across the various pillars. This organization facilitates effi-
cient data management and retrieval within the storage
system. Stripe 1 plays a role in maintaining data integrity
and optimizing storage operations. The Pillars serve as
storage units that each store a portion of data associated with
Stripe 1. As shown in FIGS. 5B and 5C, each of the Pillars
includes multiple drives (e.g., 48 drives), each numbered 00,
01, 02, 03, . . . 46, 47, 48.

In this example, consider a vault with IDA of 8/5/7
(Width/Threshold/Write threshold) with 1 stripe (e.g., width
of 8 memory devices across 8 memory devices). In this
example, one drive from each memory device goes out of
service or become unavailable. In general, this failure should
not impact the overall health of the device as well as a set, stripe, storage pool, or vault. But if it constitutes, a gap in portion of namespace range of a vault, then the embodiments described herein warn the user or take a corrective action. In this example, inaccessibility to 4 drives out of 384 results in unavailability of a portion of the namespace range for reads or writes. Each pillar by itself may seem healthy as shown in FIG. 5A.

Even though individually each pillar looks healthy, a portion of namespace range is not healthy. For example, each of the drives 03 in Pillar 9, Pillar 2, Piller 3, and Piller 6 are unavailable as shown in FIG. 5B (the crosshatching represents an unavailable drive or pillar). Accordingly, one or more embodiments described herein identifies the namespace range gap and warns the user about the unavailability of the portion of namespace range, as it can be seen in FIGS. 5B and 5C. In the arrangement of FIG. 5C, it is evident that the drives 03 across Pillar 9, Pillar 2, Piller 3, and Piller 6 are unavailable as shown by the box 502.

Figure 6A:
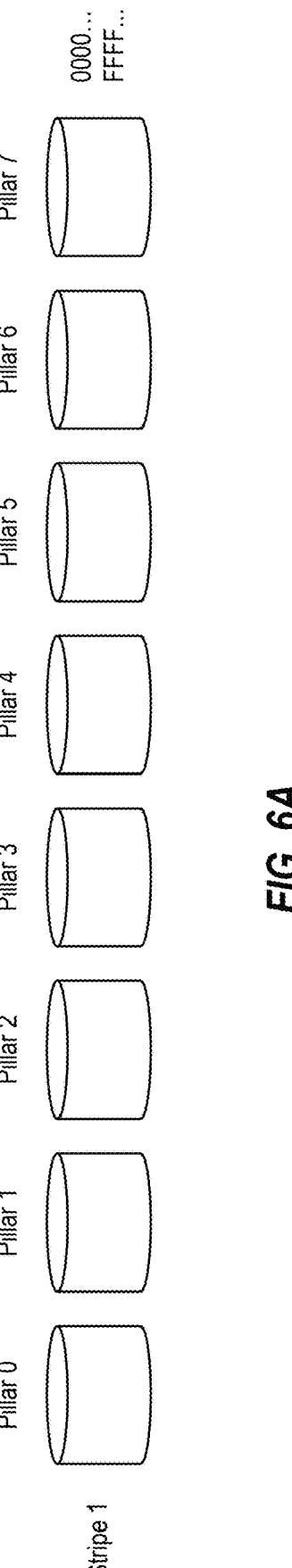
Figure 6B:
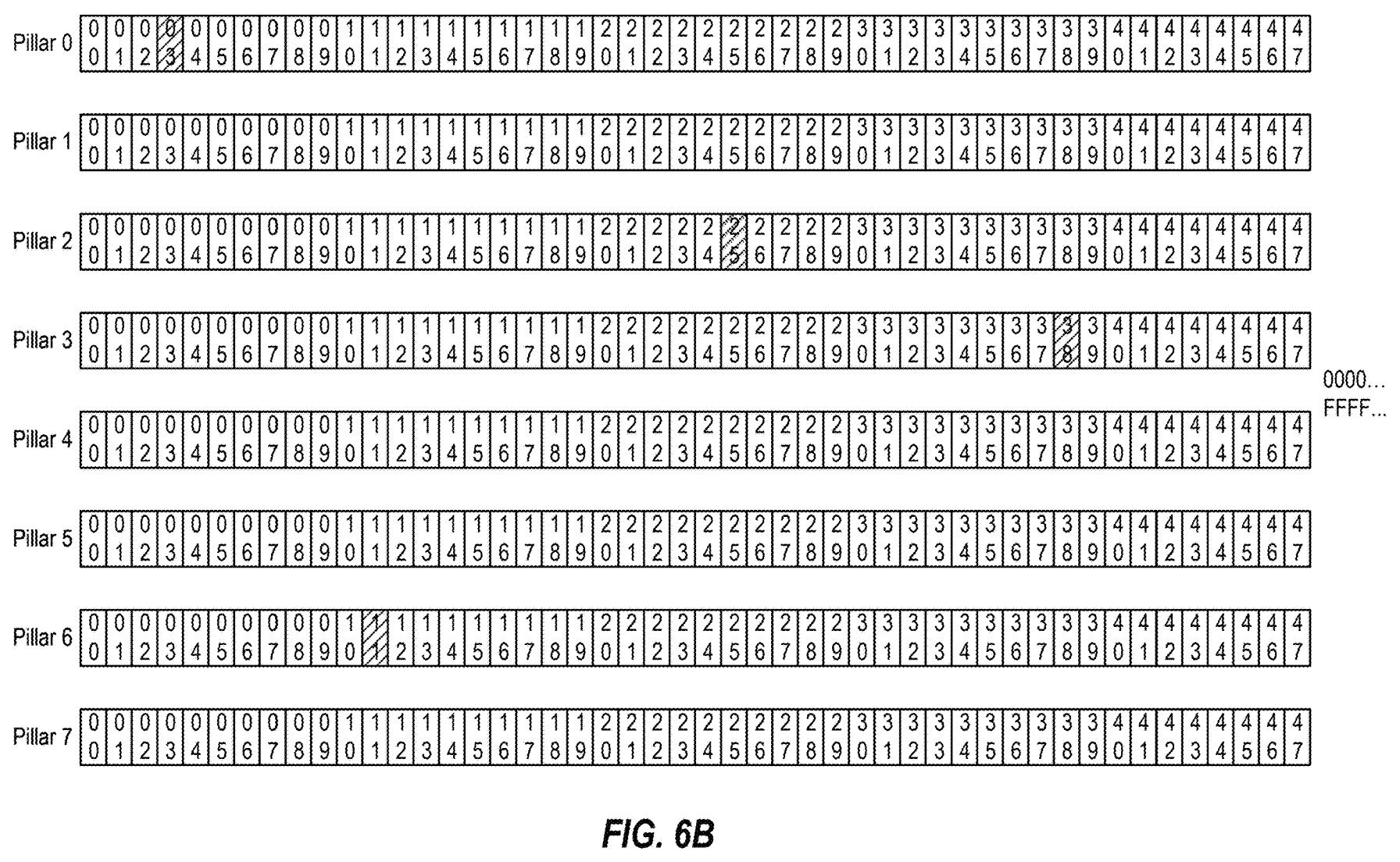

Another example is now described with reference to FIGS. 6A and 6B, which schematically illustrate an example of identifying and visualizing namespace range gaps, according to an embodiment.

In this example, consider the same IDA as the prior example, but in this example, the inaccessibility of 4 drives out of 384 drives does not result in unavailability of any portion of the namespace range for reads or writes. The memory nodes are reportedly healthy as shown in FIG. 6A. In the example of FIG. 6B, the namespace range is available for reads and writes, and no warning about gaps in the namespace range is sent. In this example, drive 03 from Pillar 0, drive 25 from Pillar 2, drive 38 from Pillar 3, and drive 11 Pillar 6 are not unavailable.

Figure 7A:
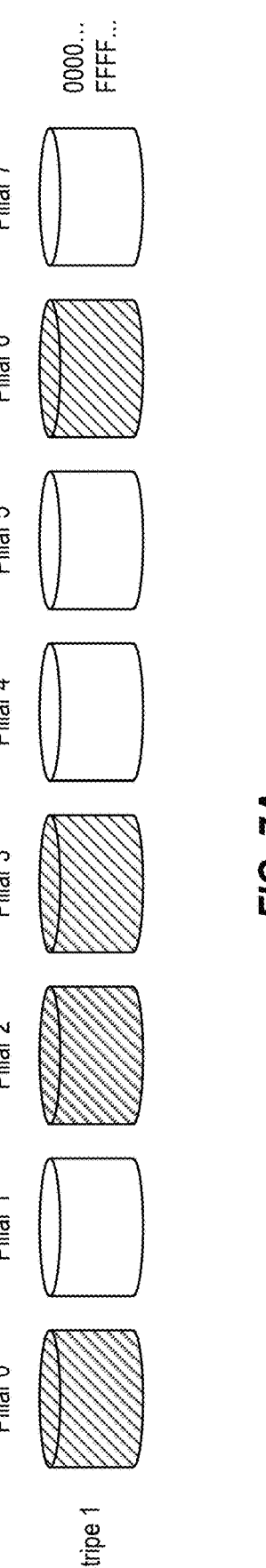
FIGS. 7A and 7B schematically illustrate an example of identifying and visualizing namespace range gaps, according to an embodiment.
Figure 7B:

Another example is now described with reference to FIGS. 7A and 7B, which schematically illustrate an example of identifying and visualizing namespace range gaps, according to an embodiment. In this example, inaccessibility to 20 drives out of 384 does not result into unavailability of any portion of the namespace range for reads or writes, as shown in FIG. 7B. In this scenario 4 of the memory devices may seem unhealthy of their own based on thresholds defined to show a device being unhealthy when certain number of drives are not available, as it can be seen in FIG. 7A. For example, a threshold for reads can be set to 4, such that if more than 4 drives are unavailable on a Pillar, the Pillar appears unavailable. Similarly, a threshold for writes can be set to 5, such that if more than 5 drives are unavailable on a Pillar, the Pillar appears unavailable. However, if the unavailable drives do not overlap, or overlap in a limited way, the Pillars are actually not unavailable in terms of the namespace range.

This can be seen in FIG. 7B, which shows that the namespace range is available for reads and writes, hence there is no warning about for gaps in the namespace range because missing drives do not constitute unavailability of any portion of the namespace range. In this example drives 01-05 from Pillar 0, drives 23-27 from Pillar 2, drives 38-42 from Pillar 3, and drives 11-15 Pillar 6 are not unavailable. However, because these drives are not aligned across Pillars, as shown in FIG. 7B, the namespace range remains available.

Another example is now described with reference to FIGS. 8A-8C, which schematically illustrate an example of identifying and visualizing namespace range gaps, according to an embodiment. In this example, when the number of memory devices is a multiple of the IDA width, each memory device is responsible for some fraction of a pillar. For example, because there are 3 times as many memory devices as IDA width, each memory device is responsible for one-third of the NSR for each Pillar. As an example, "3 stripes" as horizontal rows are as follows: in a first row (stripe 1), each memory device is responsible for the range 0000 . . . to 5555 . . . of their respective pillars; in a second row (stripe 2), each memory device is responsible for the range 5555 . . . to AAAA . . . of their respective pillars; and in a third row (stripe 3), each memory device is responsible for the range AAAA . . . to FFFF . . . of their respective pillars. In this example, as shown in FIG. 8A, each vertical column represents memory devices responsive for the same pillar.

Figure 8A:
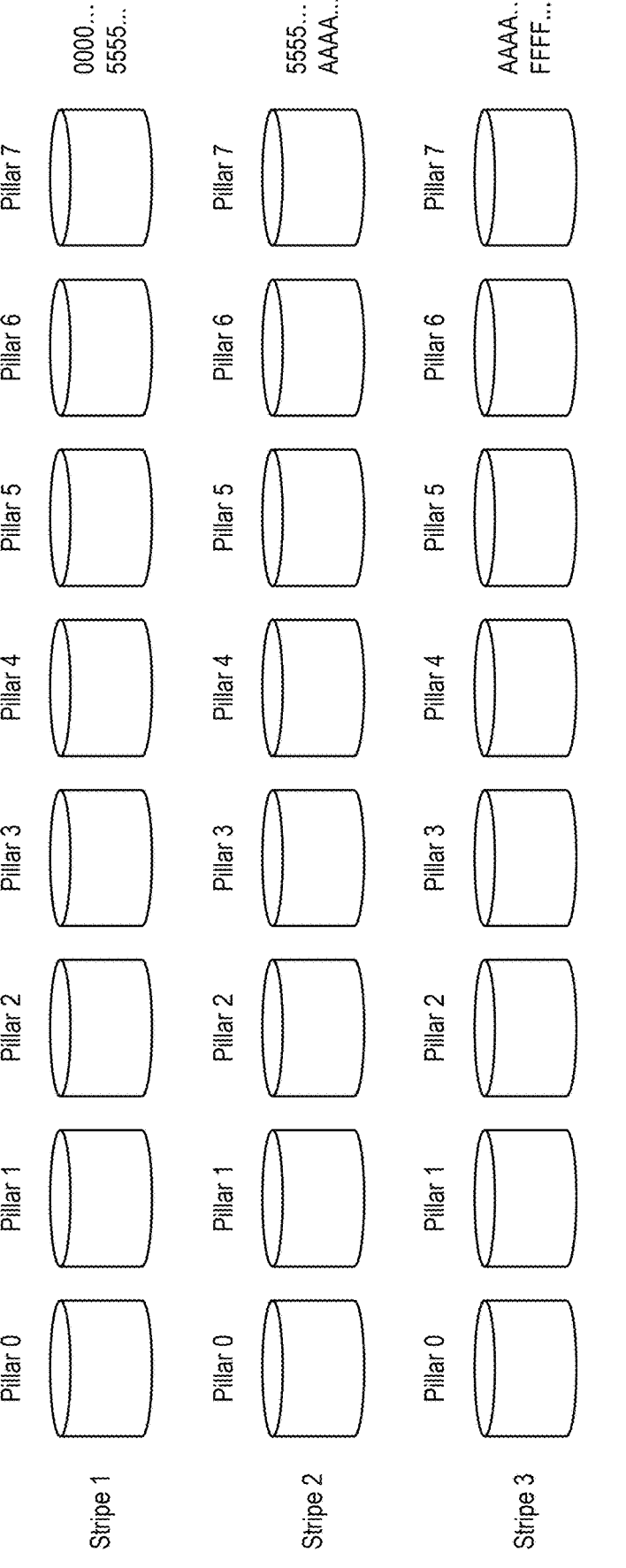
FIGS. 8A-8C schematically illustrate an example of identifying and visualizing namespace range gaps, according to an embodiment.
Figure 8B:
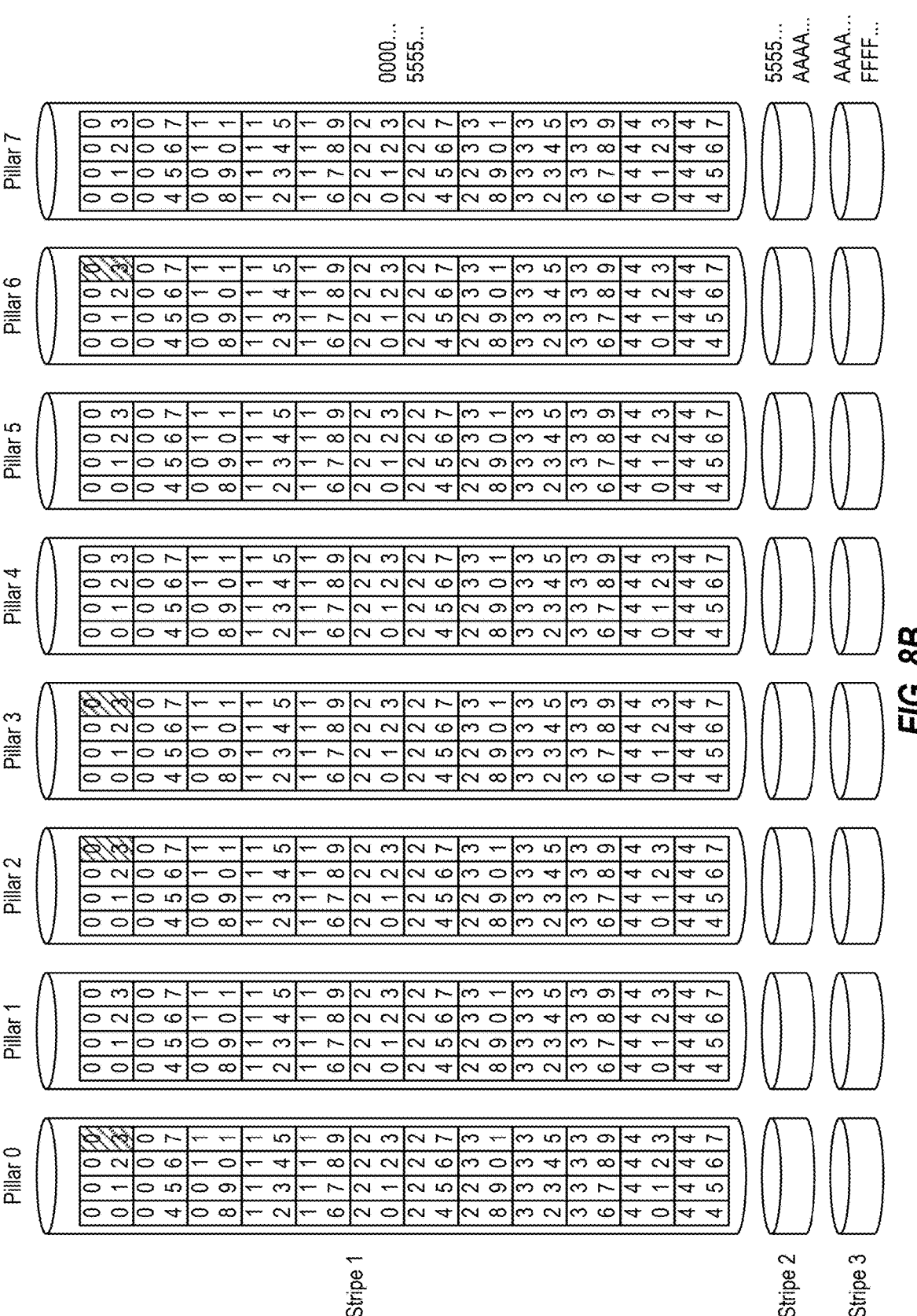
Figure 8C:
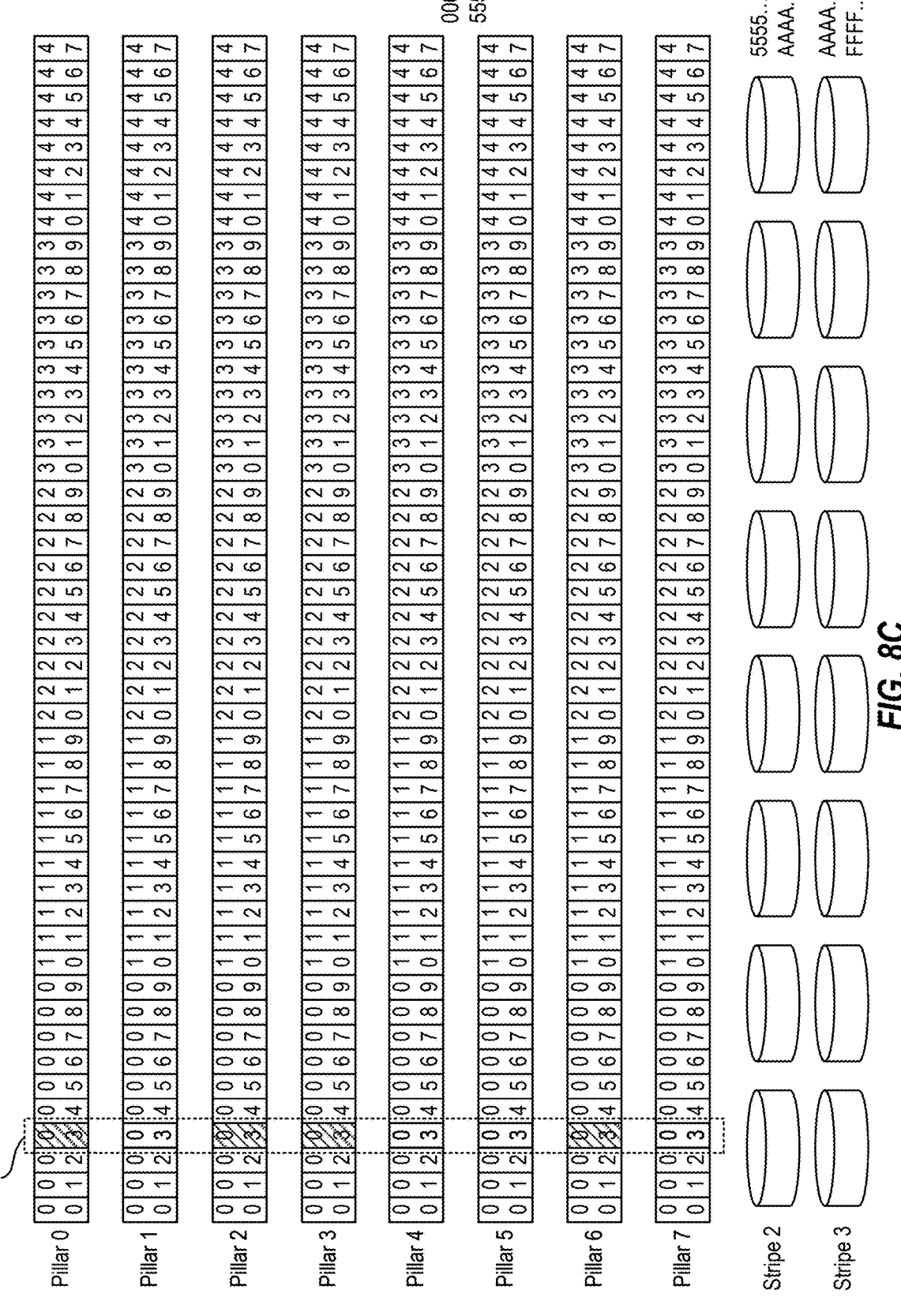

Consider an example of a vault with IDA of 8/5/7 (Width/Threshold/Write threshold) across 24 memory devices (see FIG. 8A). In this case, if the storage system 200 loses one drive from four of the memory devices from Stripe 1 from drive 03. In this example, it can be assumed that stripes 2 and 3 are healthy with no drive issues. In general, losing one drive each from four of the memory devices with 48 drives in each memory device does not impact the overall health of the device as well as a set, stripe, storage pool, or vault. Though, in this example, it constitutes a gap in portion of the namespace range of a vault.

Even though individually each pillar looks healthy but a portion of the namespace range in Stripe 1 is not healthy. As a result, one or more embodiments identify the namespace as being (at least partially) unavailability, as it can be seen in FIGS. 8B and 8C. In this example, drive 03 from Pillar 0, Pillar 2, Pillar 3, and Pillar 6 of Stripe 1 are not unavailable, and thus the associated namespace range is unavailable. For example, in FIG. 8C, the gap in the namespace range is evident as shown by box 802.

Figure 9:
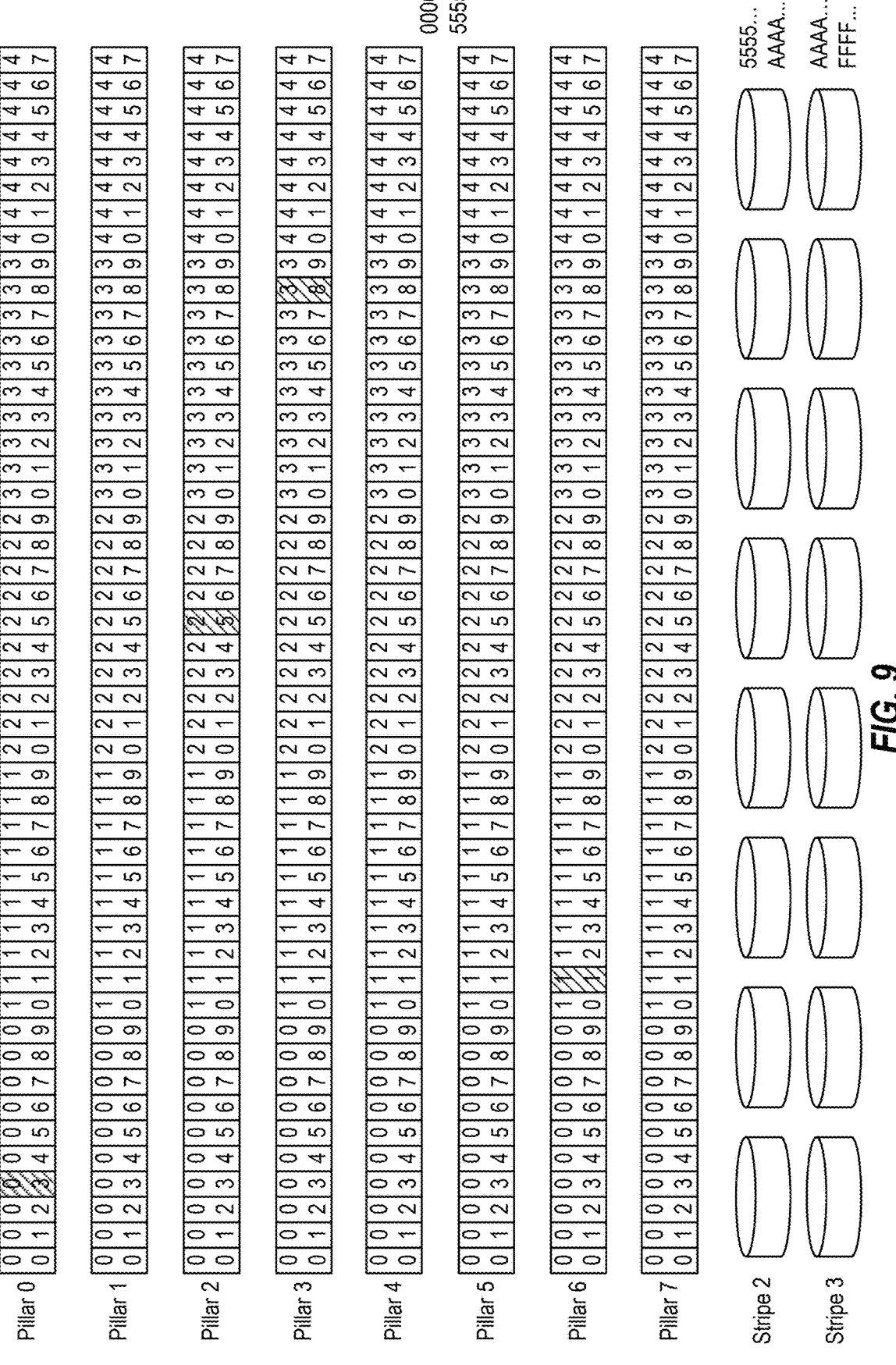
FIG. 9 schematically illustrates an example of identifying and visualizing namespace range gaps, according to an embodiment.

Another example is now described with reference to FIG. 9, which schematically illustrates an example of identifying and visualizing namespace range gaps, according to an embodiment. In this example, the same IDA as the previous example is used, but in this example inaccessibility to 4 drives out of 384 drives in Stripe 1 does not result in unavailability of any portion of the namespace range for reads or writes. For example, the drive 03 in Pillar 0, the drive 25 in Pillar 2, the drive 38 in Pillar 3, and the drive 11 in Piller 6 are unavailable. However, all the memory nodes are reported healthy as shown in FIG. 9.

Figure 10A:
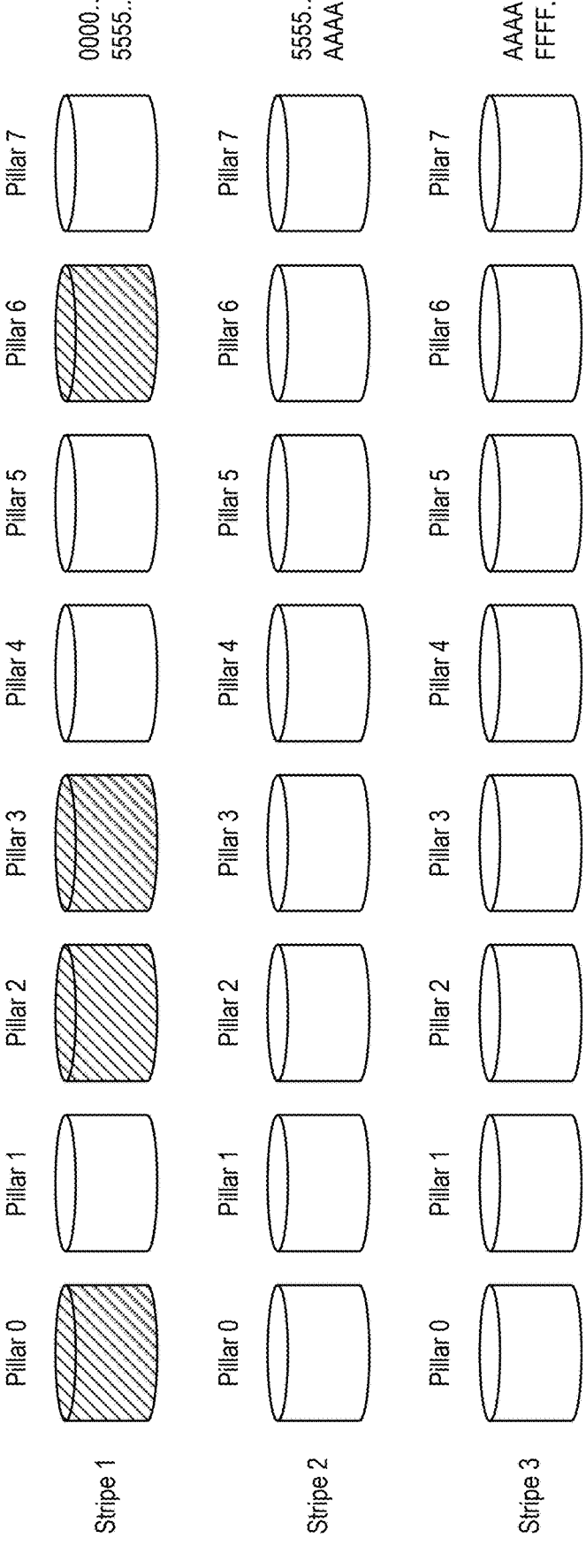
FIGS. 10A and 10B schematically illustrate an example of identifying and visualizing namespace range gaps, according to an embodiment.

Another example is now described with reference to FIGS. 10A and 10B, which schematically illustrate an example of identifying and visualizing namespace range gaps, according to an embodiment. In this example, inaccessibility to 20 drives out of 384 drives in Stripe 1 does not result into unavailability of any portion of the namespace range for reads or writes, as it can be seen in FIG. 10B. In this example, 4 of the memory devices may seem unhealthy (e.g., Pillars 0, 2, 3 and 6 of Stripe 1 as shown in FIG. 10A) individually based on thresholds defines to show a device being unhealthy when a certain number of drives are not available.

Figure 10B:
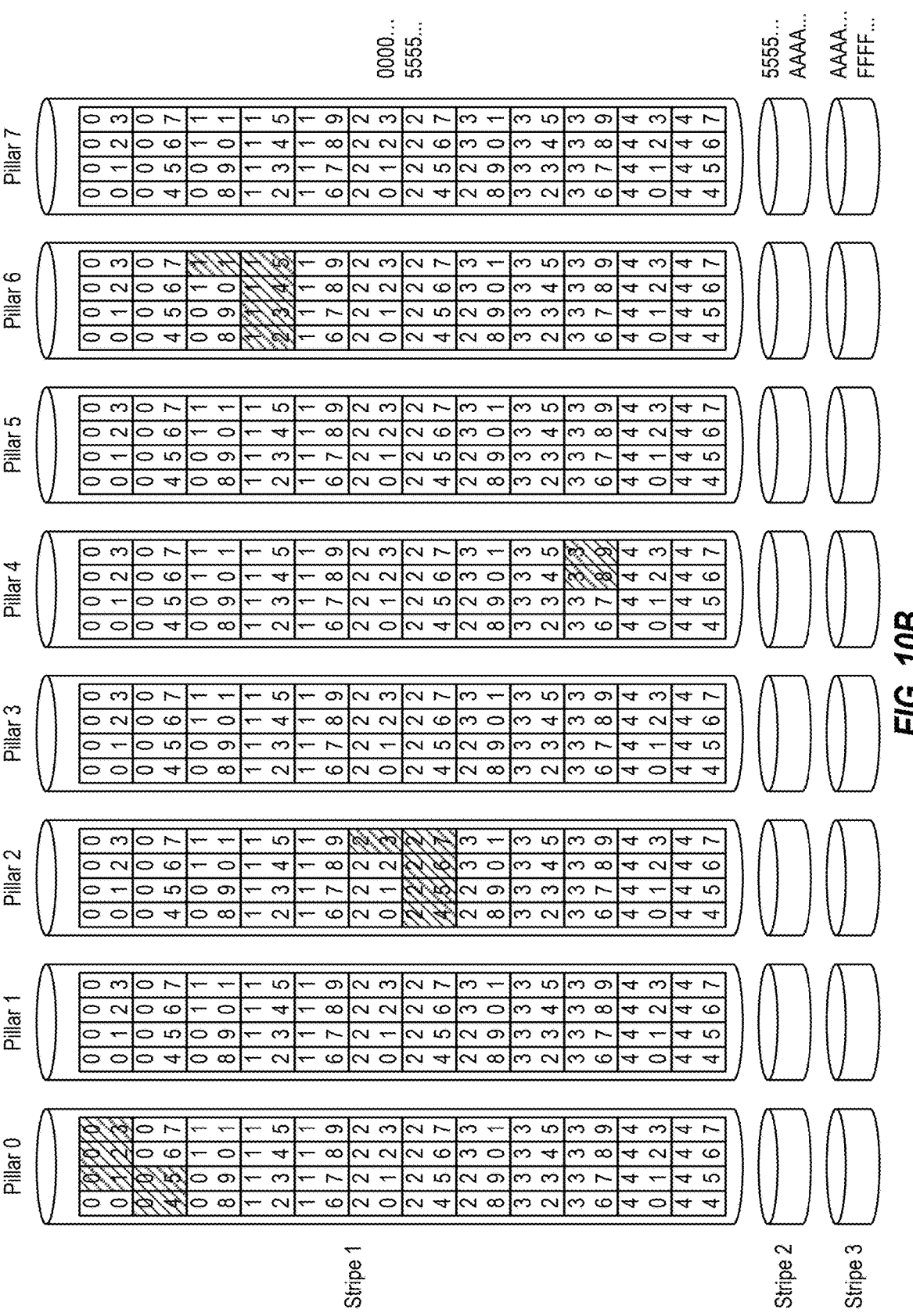

In FIG. 10B, it is shown that the namespace range is available for reads and writes, because the unavailable drives do not constitute unavailability of any portion of the namespace range. In this example drives 01-05 from Pillar 0, drives 23-27 from Pillar 2, drives 38-42 from Pillar 3, and drives 11-15 Pillar 6 from Stripe 1 are unavailable; however, because the drives do not align relative to one another across pillars, the namespace range remains available.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method comprising:
receiving, at a management device from a plurality of storage devices, namespace information for each of the plurality of storage devices, the namespace information being shared among the plurality of storage devices;
determining, by the management device, whether a namespace gap exists based at least in part on the namespace information for each of the plurality of storage devices, wherein determining whether the namespace gap exists comprises looping over each stripe of the plurality of storage devices to identify a gap that results in a vault operating in one of read only, alert, or write only mode;
responsive to determining that the namespace gap exists, generating a graphical representation of the namespace gap; and
responsive to determining that the namespace gap exists, implementing a corrective action to remediate the namespace gap.

2. The computer-implemented method of claim 1, further comprising storing, by the management device, the namespace information for each of the plurality of storage devices.

3. The computer-implemented method of claim 2, wherein the namespace information is stored in a database communicatively coupled to the management device.

4. The computer-implemented method of claim 1, wherein the namespace gap is determined to exist responsive to determining that a threshold number of memory devices of one of the plurality of storage devices are unavailable.

5. The computer-implemented method of claim 4, wherein the threshold number of memory devices is a read threshold.

6. The computer-implemented method of claim 4, wherein the threshold number of memory devices is a write threshold.

7. A system comprising:
a memory comprising computer readable instructions; and
a processing device for executing the computer readable instructions, the computer readable instructions controlling the processing device to perform operations comprising:
receiving, at a management device from a plurality of storage devices, namespace information for each of the plurality of storage devices, the namespace information being shared among the plurality of storage devices;
determining, by the management device, whether a namespace gap exists based at least in part on the namespace information for each of the plurality of storage devices, wherein determining whether the namespace gap exists comprises looping over each stripe of the plurality of storage devices to identify a gap that results in a vault operating in one of read only, alert, or write only mode;

responsive to determining that the namespace gap exists, generating a graphical representation of the namespace gap; and
responsive to determining that the namespace gap exists, implementing a corrective action to remediate the namespace gap.

8. The system of claim 7, further comprising storing, by the management device, the namespace information for each of the plurality of storage devices.

9. The system of claim 8, wherein the namespace information is stored in a database communicatively coupled to the management device.

10. The system of claim 7, wherein the namespace gap is determined to exist responsive to determining that a threshold number of memory devices of one of the plurality of storage devices are unavailable.

11. The system of claim 10, wherein the threshold number of memory devices is a read threshold.

12. The system of claim 10, wherein the threshold number of memory devices is a write threshold.

13. A computer program product comprising:
a set of one or more computer-readable storage media;
program instructions, collectively stored in the set of one or more storage media, for causing a processor set to perform the following computer operations:
receiving, at a management device from a plurality of storage devices, namespace information for each of the plurality of storage devices, the namespace information being shared among the plurality of storage devices;
determining, by the management device, whether a namespace gap exists based at least in part on the namespace information for each of the plurality of storage devices, wherein determining whether the namespace gap exists comprises looping over each stripe of the plurality of storage devices to identify a gap that results in a vault operating in one of read only, alert, or write only mode;
responsive to determining that the namespace gap exists, generating a graphical representation of the namespace gap; and
responsive to determining that the namespace gap exists, implementing a corrective action to remediate the namespace gap.

14. The computer program product of claim 13, further comprising storing, by the management device, the namespace information for each of the plurality of storage devices.

15. The computer program product of claim 14, wherein the namespace information is stored in a database communicatively coupled to the management device.

16. The computer program product of claim 13, wherein the namespace gap is determined to exist responsive to determining that a threshold number of memory devices of one of the plurality of storage devices are unavailable.

17. The computer program product of claim 16, wherein the threshold number of memory devices is a read threshold.

* * * * *